(12) United States Patent
Jiang et al.

(10) Patent No.: US 9,992,760 B2
(45) Date of Patent: Jun. 5, 2018

(54) METHOD FOR UPDATING RPLMN INFORMATION AND USER EQUIPMENT

(71) Applicant: Huawei Technologies Co., Ltd., Shenzhen (CN)

(72) Inventors: Yinqing Jiang, Wuhan (CN); Hui Jin, Beijing (CN); Xiaoyan Chen, Wuhan (CN); Xiaojian Liu, Wuhan (CN); Lin Shu, Shanghai (CN); Li Shen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

(21) Appl. No.: 15/310,741

(22) PCT Filed: May 12, 2014

(86) PCT No.: PCT/CN2014/077273
§ 371 (c)(1),
(2) Date: Nov. 11, 2016

(87) PCT Pub. No.: WO2015/172289
PCT Pub. Date: Nov. 19, 2015

(65) Prior Publication Data
US 2017/0127371 A1 May 4, 2017

(51) Int. Cl.
*H04W 4/00* (2018.01)
*H04W 60/04* (2009.01)
(Continued)

(52) U.S. Cl.
CPC .......... *H04W 60/04* (2013.01); *H04B 1/3816* (2013.01); *H04W 8/06* (2013.01); *H04W 8/183* (2013.01)

(58) Field of Classification Search
CPC ....... H04W 60/04; H04W 8/183; H04W 8/06; H04B 1/3816
(Continued)

(56) References Cited

U.S. PATENT DOCUMENTS 6,308,267 B1   10/2001  Gremmelmaier
7,486,957 B2 *  2/2009  Rajaniemi ............. H04W 60/04
                                                       455/432.1
(Continued)

FOREIGN PATENT DOCUMENTS

CN        101674628 A       3/2010
CN        102158922 A       8/2011
(Continued)

*Primary Examiner* — Marceau Milord
(74) *Attorney, Agent, or Firm* — Slater Matsil, LLP (57) ABSTRACT

A method can be implemented by a user equipment to update RPLMN information. A PLMN identifier is selected from an available PLMN identifier set that includes PLMN identifiers with RPLMN information, HPLMN information, UPLMN information, and OPLMN information separately. A location update request message that carries the PLMN identifier is sent to a mobile switching center. A TMSI reallocation command is acquired from the mobile switching center according to the location update request message. It is determined whether location update acceptance information that is returned by the mobile switching center according to the location update request message is currently acquired. An operation of updating the PLMN identifier to registered public land mobile network RPLMN information is performed when the location update acceptance information is acquired and the operation of updating the PLMN identifier to RPLMN information is skipped when the location update acceptance information is not acquired.

10 Claims, 5 Drawing Sheets

(51) Int. Cl.
*H04W 8/06* (2009.01)
*H04W 8/18* (2009.01)
*H04B 1/3816* (2015.01)

(58) Field of Classification Search
USPC ...... 455/435.2, 435.3, 433, 558, 432.1, 434, 455/411
See application file for complete search history.

(56) References Cited

U.S. PATENT DOCUMENTS

| | | | | |
|---|---|---|---|---|
| 8,116,735 | B2* | 2/2012 | Liu | H04W 12/06 370/328 |
| 8,285,280 | B2* | 10/2012 | Kim | H04W 60/02 370/331 |
| 8,811,935 | B2* | 8/2014 | Faccin | H04W 48/18 455/404.1 |
| 9,026,136 | B2* | 5/2015 | Jin | H04W 60/005 455/432.1 |
| 9,031,555 | B2* | 5/2015 | Kim | H04W 48/18 455/432.1 |
| 9,125,146 | B1* | 9/2015 | Edara | H04W 48/18 |
| 9,313,726 | B2* | 4/2016 | Dang | H04W 48/16 |
| 9,699,644 | B2* | 7/2017 | Noldus | H04W 8/12 |
| 9,736,689 | B2* | 8/2017 | Liu | H04W 12/06 |
| 2004/0192254 | A1 | 9/2004 | Choi et al. | |
| 2008/0160942 | A1 | 7/2008 | Koyama et al. | |
| 2009/0170507 | A1 | 7/2009 | Kim | |
| 2009/0305668 | A1* | 12/2009 | Ahn | H04W 12/06 455/410 |
| 2010/0216465 | A1* | 8/2010 | Mubarek | H04W 48/18 455/435.1 |
| 2011/0177810 | A1* | 7/2011 | Kim | H04W 48/18 455/432.1 |
| 2012/0243467 | A1* | 9/2012 | Vallurupalli | H04W 48/18 370/328 |
| 2012/0309399 | A1 | 12/2012 | Wu et al. | |
| 2013/0044709 | A1 | 2/2013 | Adjakple et al. | |
| 2014/0342732 | A1* | 11/2014 | Manalo | H04W 8/06 455/433 |
| 2015/0119028 | A1* | 4/2015 | Zhang | H04W 48/18 455/434 |

FOREIGN PATENT DOCUMENTS

| | | |
|---|---|---|
| CN | 103716774 A | 4/2014 |
| EP | 0805608 A1 | 5/1997 |
| EP | 2555547 A1 | 6/2013 |
| JP | 2007068003 A | 3/2007 |
| JP | 2013042491 A | 2/2013 |
| KR | 20040069573 A | 8/2004 |
| KR | 20140054299 A | 5/2014 |
| WO | 0221861 A2 | 3/2002 |

* cited by examiner

METHOD FOR UPDATING RPLMN INFORMATION AND USER EQUIPMENT

CROSS-REFERENCE TO RELATED APPLICATIONS

This application is a national stage of International Application No. PCT/CN2014/077273, filed on May 12, 2014, which is hereby incorporated by reference in its entirety.

TECHNICAL FIELD

The present invention relates to the field of communications technologies, and in particular, to a method for updating RPLMN information and user equipment.

BACKGROUND

With continuous development of communications technologies, mobile communication has become a communication manner widely used by global users. Before establishing mobile communication, UE (User Equipment), such as a mobile terminal, needs to select a PLMN (Public Land Mobile Network) identifier and register successfully in an MSC (Mobile Switch Center), so that the UE can normally perform a mobile communication service, such as a voice service or a data service. To help the user equipment to rapidly select a PLMN identifier and register successfully, upon power-on, the user equipment preferentially selects a PLMN identifier stored in a card file EF_LOCI of a SIM (Subscriber Identity Module) card, that is, a PLMN identifier in RPLMN (Registered PLMN) information. The PLMN identifier is a PLMN identifier using which the user equipment initiates registration to the mobile switching center last time before last power-off.

In an existing 3GPP ($3^{rd}$ Generation Partnership Project) protocol, user equipment sends a selected PLMN identifier to a mobile switching center by using a location update request message; the mobile switching center returns a TMSI (Temporary Mobile Subscriber Identity) reallocation command, location update acceptance information, or location update rejection information to the user equipment according to the location update request message; and after acquiring the TMSI reallocation command or the location update acceptance information, the user equipment updates the selected PLMN identifier to the card file EF_LOCI, that is, the RPLMN information, of the SIM card, so that the user equipment can acquire the PLMN identifier directly from the card file EF_LOCI upon next power-on and initiate registration. It can be seen from above that the user equipment updates the PLMN identifier to the card file EF_LOCI at least twice, which reduces efficiency of registering the user equipment with the mobile network.

SUMMARY

Embodiments of the present invention provide a method for updating RPLMN information and user equipment, which can improve efficiency of registering the user equipment with the mobile network.

A first aspect of an embodiment of the present invention provides a method for updating RPLMN information, including sending, to a mobile switching center, a location update request message that carries a public land mobile network PLMN identifier; after a temporary identity TMSI reallocation command that is returned by the mobile switching center according to the location update request message is acquired, determining whether location update acceptance information that is returned by the mobile switching center according to the location update request message is currently acquired; and if the location update acceptance information is acquired, updating the PLMN identifier to registered public land mobile network RPLMN information; or if the location update acceptance information is not acquired, skipping an operation of updating the PLMN identifier to RPLMN information, where the operation is triggered by the TMSI reallocation command.

In a first possible implementation manner of the first aspect, before the sending, to a mobile switching center, a location update request message that carries a PLMN identifier, the method further includes: selecting the PLMN identifier from an available PLMN identifier set. The available PLMN identifier set includes PLMN identifiers that are included in the RPLMN information, home public land mobile network HPLMN information, user selected public land mobile network UPLMN information, and operator provided public land mobile network OPLMN information separately.

With reference to the first aspect and the first possible implementation manner of the first aspect, in a second possible implementation manner, a priority order for the selecting the PLMN identifier from an available PLMN identifier set is: the PLMN identifier in the RPLMN information, the PLMN identifier in the HPLMN information, the PLMN identifier in the UPLMN information, and the PLMN identifier in the OPLMN information.

With reference to the first aspect and the first possible implementation manner of the first aspect, in a third possible implementation manner, after the sending, to a mobile switching center, a location update request message that carries a PLMN identifier, the method further includes, if location update rejection information that is returned by the mobile switching center according to the location update request message is acquired, reselecting another PLMN identifier from the available PLMN identifier set and implementing sending, to the mobile switching center, of a location update request message that carries the reselected PLMN identifier.

With reference to the first aspect and the third possible implementation manner of the first aspect, in a fourth possible implementation manner, after the location update rejection information that is returned by the mobile switching center according to the location update request message is acquired, the method further includes: determining whether a PLMN identifier that is the same as the PLMN identifier is recorded in the RPLMN information; and if a PLMN identifier that is the same as the PLMN identifier is recorded in the RPLMN information, deleting the PLMN identifier from the RPLMN information.

With reference to the possible implementation manners of the first aspect, in a fifth possible implementation manner, the TMSI reallocation command carries the PLMN identifier; and the updating the PLMN identifier to RPLMN information includes updating, to the RPLMN information, the PLMN identifier carried in the TMSI reallocation command.

With reference to the first aspect and any one of the first to the sixth possible implementation manners of the first aspect, in a seventh possible implementation manner, the RPLMN information is stored in a card file EF_LOCI of a subscriber identity module SIM card.

A second aspect of an embodiment of the present invention provides a computer storage medium, where a program is stored in the computer storage medium, and when being executed, the program implements a part or all of steps of the method for updating RPLMN information that is provided in the first aspect.

A third aspect of an embodiment of the present invention provides user equipment, where the user equipment includes a request message sending module, configured to send, to a mobile switching center, a location update request message that carries a PLMN identifier; an acceptance information determining module, configured to: after a TMSI reallocation command that is returned by the mobile switching center according to the location update request message is acquired, determine whether location update acceptance information that is returned by the mobile switching center according to the location update request message is currently acquired; and an update policy execution module, configured to: if the location update acceptance information is acquired, update the PLMN identifier to RPLMN information; or if the location update acceptance information is not acquired, skip an operation of updating the PLMN identifier to RPLMN information, where the operation is triggered by the TMSI reallocation command.

In a first possible implementation manner of the third aspect, the user equipment further includes: a network code selection module, configured to select the PLMN identifier from the RPLMN information, HPLMN information, UPLMN information, and OPLMN information sequentially according to the following priority order: the RPLMN information, the HPLMN information, the UPLMN information, and the OPLMN information.

With reference to the third aspect and the first possible implementation manner of the third aspect, in a second possible implementation manner, the user equipment further includes a network code reselection module, configured to reselect another PLMN identifier if location update rejection information that is returned by the mobile switching center according to the location update request message is acquired, where the request message sending module is further configured to implement sending, to the mobile switching center, of a location update request message that carries the reselected PLMN identifier.

With reference to the possible implementation manners of the third aspect, in a third possible implementation manner, the TMSI reallocation command carries the PLMN identifier; and the update policy execution module is configured to update, to the RPLMN information, the PLMN identifier carried in the TMSI reallocation command.

With reference to the third aspect and any one of the first to the third possible implementation manners of the third aspect, in a fourth possible implementation manner, the RPLMN information is stored in a card file EF_LOCI of a SIM card.

A fourth aspect of an embodiment of the present invention provides user equipment, where the user equipment includes a radio signal transceiving apparatus, a memory, and a processor, a set of programs are stored in the memory, and the processor is configured to invoke a program stored in the memory to perform the following operations: sending, to a mobile switching center, a location update request message that carries a PLMN identifier; after a TMSI reallocation command that is returned by the mobile switching center according to the location update request message is acquired, determining whether location update acceptance information that is returned by the mobile switching center according to the location update request message is currently acquired; and if the location update acceptance information is acquired, updating the PLMN identifier to RPLMN information; or if the location update acceptance information is not acquired, skipping an operation of updating the PLMN identifier to RPLMN information, where the operation is triggered by the TMSI reallocation command.

It can be seen from above that in embodiments of the present invention, user equipment temporarily does not update RPLMN information when a TMSI reallocation command that is returned by a mobile switching center according to a location update request message is acquired, but updates the RPLMN information after it is determined that location update request acceptance information that is returned by the mobile switching center is received, which improves efficiency of registering the user equipment with the mobile network.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

User equipment (UE) provided in the embodiments of the present invention may include a mobile terminal, such as a mobile phone, a tablet computer, a personal computer, an e-reader, or an in-vehicle terminal. The user equipment may perform voice or data communication with one or more mobile switching centers by using a radio signal transceiving apparatus.

A mobile switching center (MSC) provided in the embodiments of the present invention is the core of the entire mobile communications network. It controls services of all base station controllers (BSC) and provides a switching function and a connection to another function in the system. The mobile switching center may directly provide, or use a mobile gateway (GMSC) to provide an interface function for a fixed network, such as a public switched telephone network (PSTN), an integrated services digital network (ISDN) or a public data network (PDN), so as to connect a mobile subscriber and a mobile subscriber and connect a mobile subscriber and a fixed network subscriber.

Figure 1:
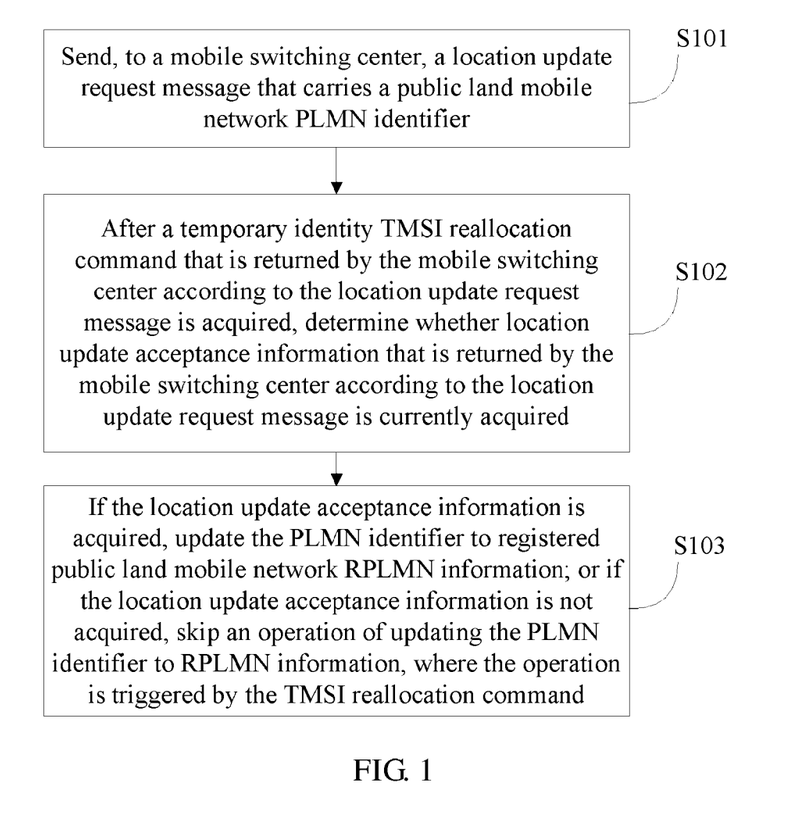
FIG. 1 is a schematic flowchart of a method for updating RPLMN information according to an embodiment of the present invention.

FIG. 1 is a schematic flowchart of a method for updating RPLMN information according to an embodiment of the present invention. As shown in FIG. 1, a process of the method for updating RPLMN information in this embodiment may include the following steps.

S101. User equipment sends, to a mobile switching center, a location update request message that carries a public land mobile network PLMN identifier.

The PLMN identifier is used to identify a PLMN. The PLMN is a network established and managed by a government or an operator to provide a land mobile communication service for the public. The PLMN is generally formed by multiple cells Cell, where the Cells are the smallest coverage units in a mobile communications network. The PLMN identifier is uniquely and jointly determined by an MCC (mobile country code) and an MNC (mobile network code), where the MCC includes three digits and the MNC includes two digits.

After being powered on, the user equipment selects the PLMN identifier from an available PLMN identifier set, where the available PLMN identifier set includes PLMN identifiers that are included in RPLMN information, HPLMN (home public land mobile network) information, UPLMN (user selected public land mobile network) information, and OPLMN (operator provided public land mobile network) information separately. The RPLMN information is stored in a card file EF_LOCI of a SIM (subscriber identity module) card and records a PLMN identifier using which the user equipment initiates registration to the mobile switching center last time before last power-off. The SIM card may be disposed in the user equipment, so that the user equipment can read a card file of the SIM card. Optionally, the user equipment selects the PLMN identifier from all of the foregoing types of information according to the following priority order: the RPLMN information→the HPLMN information→the UPLMN information→the OPLMN information. It should be pointed out that, as the PLMN identifier using which the user equipment registers before last power-off, the PLMN identifier in the RPLMN information is of the highest priority because the PLMN identifier is optimal in terms of a registration success ratio and registration time.

Specifically, after being powered on, the user equipment selects a PLMN identifier (PLMN_1 is used below to represent the selected PLMN identifier) according to the foregoing priority order, and then sends, to the mobile switching center and based on the OTA (Over The Air Technology, over the air technology), a location update request message that carries the PLMN_1, where the OTA can implement signaling exchange between the user equipment and the mobile switching center. The location update request message, for example, the "Location_Update_Request" instruction in a 3GPP protocol, is used to initiate LU (Location Update, location update). A purpose of initiating the LU is to register the user equipment with a PLMN identifier, so that the user equipment can access the mobile communications network.

Further, the mobile switching center identified by the PLMN_1 receives the location update request message sent by the user equipment. Then, the mobile switching center determines whether the PLMN_1 sent by the user equipment can be registered with. For a specific determining method, reference may be made to a 3GPP protocol, and details are not described herein. Generally, if the PLMN_1 can be registered with, the mobile switching center sends, to the user equipment and based on the OTA, location update acceptance information, for example, the "Location_Update_Accept" instruction in a 3GPP protocol; or if the PLMN_1 cannot be registered with, the mobile switching center sends, to the user equipment and based on the OTA, location update rejection information, for example, the "Location_Update_Reject" instruction in a 3GPP protocol.

S102. After acquiring a temporary identity TMSI reallocation command that is returned by the mobile switching center according to the location update request message, the user equipment determines whether location update acceptance information that is returned by the mobile switching center according to the location update request message is currently acquired.

The TMSI is a temporary subscriber identity delivered by using a VLR (Visitor Location Register, visitor location register) on a network side to enhance confidentiality of a mobile communications system. To achieve the confidentiality, the VLR continuously updates the TMSI to the user equipment, where the updating the TMSI is initiated by an operation of sending, to the user equipment by the mobile switching center, a TMSI reallocation command, for example, the "TMSI_Reallocation_Command" instruction in a 3GPP protocol. When receiving the location update request message sent by the user equipment, the mobile switching center sends the TMSI reallocation command to the user equipment and based on the OTA. Therefore, after sending the location update request message to the mobile switching center, the user equipment acquires the TMSI reallocation command that is returned by the mobile switching center. It should be pointed out that the TMSI reallocation command triggers the user equipment to update the RPLMN information. For example, the user equipment updates the PLMN_1 to the RPLMN information.

Specifically, after acquiring the TMSI reallocation command that is returned by the mobile switching center according to the location update request message, the user equipment first determines whether the location update acceptance information that is returned by the mobile switching center according to the location update request message is currently acquired.

S103. If the user equipment acquires the location update acceptance information, the user equipment updates the PLMN identifier to registered public land mobile network RPLMN information; or if the location update acceptance information is not acquired, the user equipment skips an operation of updating the PLMN identifier to RPLMN information, where the operation is triggered by the TMSI reallocation command.

Specifically, after acquiring the location update acceptance information sent by the mobile switching center, the user equipment updates the PLMN_1 to the RPLMN information, that is, saves the PLMN_1 in the card file EF_LOCI of the SIM card; or if the location update acceptance information sent by the mobile switching center is not acquired, the user equipment does not update the PLMN_1 to the RPLMN information. Therefore, the user equipment does not need to update the PLMN_1 to the RPLMN information twice, which improves efficiency of registering the user equipment with the mobile network.

It should be pointed out that according to a solution in the prior art, after acquiring the temporary identity TMSI reallocation command that is returned by the mobile switching center, the user equipment directly updates the PLMN_1 to the RPLMN information, resulting in the following problem: It is assumed that the user equipment is powered off after updating the PLMN_1 to the RPLMN information, and a message that is returned by the mobile switching center according to the location update request message after the power-off is location update rejection information (that is, the registration with the PLMN_1 identifier is invalid), the user equipment fails to receive the location update rejection information because of being powered off, and then, upon next power-on, the user equipment still preferentially selects the PLMN_1 from the RPLMN information to send a location update request message, which prolongs a time for registering the user equipment with the mobile network. Therefore, by means of the determining in S103, the user equipment can prevent occurrence of the foregoing problem and ensures that a valid PLMN identifier is updated to the RPLMN information.

Optionally, the TMSI reallocation command sent by the mobile switching center carries an LAI (Location Area Identity, location identity). The LAI consists of an MCC, an MNC, and an LAC (Location Area Code, location code), and it is also known that a PLMN consists of an MCC and an MNC. Therefore, it can be learned that the TMSI reallocation command carries a PLMN identifier, that is, carries the PLMN_1. Then, a specific implementation manner of updating, by the user equipment, the PLMN_1 to the RPLMN information may be: the user equipment acquires the PLMN_1 from the TMSI reallocation command and updates the PLMN_1 to the RPLMN information. This implementation manner enriches alternative manners of updating, by the user equipment, the RPLMN information.

In this embodiment of the present invention, user equipment temporarily does not update RPLMN information when a TMSI reallocation command that is returned by a mobile switching center according to a location update request message is acquired, but updates the RPLMN information after it is determined that location update request acceptance information that is returned by the mobile switching center is received. This can improve efficiency of registering the user equipment with the mobile network and can also prevent the user equipment from updating an invalid PLMN identifier to the RPLMN information, thereby accelerating a speed of connecting the user equipment to the mobile network after next power-on and improving user experience.

Figure 2:
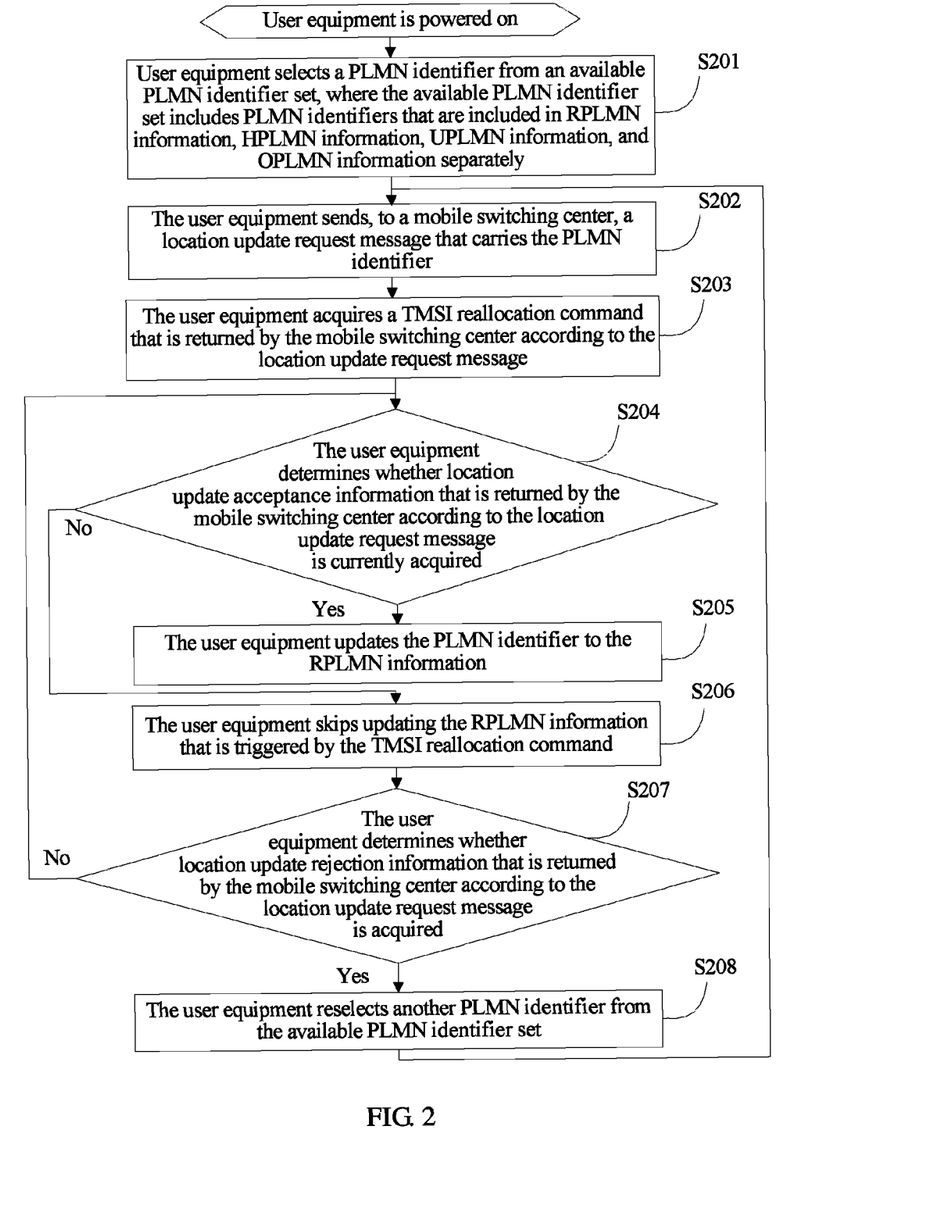
FIG. 2 is a schematic flowchart of another method for updating RPLMN information according to an embodiment of the present invention.

FIG. 2 is a schematic flowchart of another method for updating RPLMN information according to an embodiment of the present invention. The method may include the following steps.

S201. User equipment selects a PLMN identifier from an available PLMN identifier set, where the available PLMN identifier set includes PLMN identifiers that are included in RPLMN information, HPLMN information, UPLMN information, and OPLMN information separately.

The PLMN identifier is used to identify a PLMN. The PLMN is a network established and managed by a government or an operator to provide a land mobile communication service for the public. The PLMN is generally formed by multiple Cells, where the Cells are the smallest coverage units in a mobile communications network. The PLMN identifier is uniquely and jointly determined by an MCC and an MNC, where the MCC includes three digits and the MNC includes two digits.

The RPLMN information is stored in a card file EF_LOCI of a SIM card and records a PLMN identifier using which the user equipment initiates registration to the mobile switching center last time before last power-off. The SIM card may be disposed in the user equipment, so that the user equipment can read a card file of the SIM card. Optionally, the user equipment selects the PLMN identifier from all of the foregoing types of information according to the following priority order: the RPLMN information→the HPLMN-→information→the UPLMN information→the OPLMN information. It should be pointed out that, as the PLMN identifier using which the user equipment registers before last power-off, the PLMN identifier in the RPLMN information is of the highest priority because the PLMN identifier is optimal in terms of a registration success ratio and registration time.

Specifically, after being powered on, the user equipment selects a PLMN identifier (PLMN_1 is used below to represent the selected PLMN identifier) according to the foregoing priority order.

S202. The user equipment sends, to a mobile switching center, a location update request message that carries the PLMN identifier.

Specifically, the user equipment sends, to the mobile switching center and based on the OTA, the location update request message that carries the PLMN_1. The location update request message, for example, the "Location_Update_Request" instruction in a 3GPP protocol, is used to initiate LU. A purpose of the LU is to register the user equipment with a PLMN identifier, so that the user equipment can access the mobile communications network.

Further, the mobile switching center identified by the PLMN_1 receives the location update request message sent by the user equipment. Then, the mobile switching center determines whether the PLMN_1 sent by the user equipment can be registered with. For a specific determining method, reference may be made to a 3GPP protocol, and details are not described herein. Generally, if the PLMN_1 can be registered with, the mobile switching center sends, to the user equipment and based on the OTA, location update acceptance information, for example, the "Location_Update_Accept" instruction in a 3GPP protocol; or if the PLMN_1 cannot be registered with, the mobile switching center sends, to the user equipment and based on the OTA, location update rejection information, for example, the "Location_Update_Reject" instruction in a 3GPP protocol.

S203. The user equipment acquires a TMSI reallocation command that is returned by the mobile switching center according to the location update request message.

The TMSI is a temporary subscriber identity delivered by using a VLR on a network side to enhance confidentiality of a mobile communications system. To achieve the confidentiality, the VLR continuously updates the TMSI to the user equipment, where the updating the TMSI is initiated by an operation of sending, to the user equipment by the mobile switching center, a TMSI reallocation command, for example, the "TMSI_Reallocation_Command" instruction in a 3GPP protocol. An existing 3GPP protocol stipulates when a mobile switching center sends a TMSI reallocation command to user equipment. According to one stipulation, when receiving the location update request message sent by the user equipment, the mobile switching center sends the TMSI reallocation command to the user equipment and based on the OTA. Therefore, after sending the location update request message to the mobile switching center, the user equipment acquires the TMSI reallocation command that is returned by the mobile switching center. It should be pointed out that the TMSI reallocation command triggers the user equipment to update the RPLMN information. For example, the user equipment updates the PLMN_1 to the RPLMN information.

Specifically, the user equipment acquires the TMSI reallocation command that is returned by the mobile switching center according to the location update request message.

S204. The user equipment determines whether location update acceptance information that is returned by the mobile switching center according to the location update request message is currently acquired.

Specifically, after acquiring the TMSI reallocation command that is returned by the mobile switching center according to the location update request message, the user equipment first determines whether the location update acceptance information that is returned by the mobile switching center according to the location update request message is currently acquired. If the location update acceptance information is currently acquired, the user equipment goes to step S205. If the location update acceptance information is not acquired, the user equipment goes to step S206.

S205. The user equipment updates the PLMN identifier to the RPLMN information.

Specifically, the user equipment updates the PLMN_1 to the RPLMN information, that is, saves the PLMN_1 in the card file EF_LOCI of the SIM card. It should be pointed out that according to a solution in the prior art, after acquiring the temporary identity TMSI reallocation command that is returned by the mobile switching center, the user equipment directly updates the PLMN_1 to the RPLMN information, resulting in the following problem: It is assumed that the user equipment is powered off after updating the PLMN_1 to the RPLMN information, and a message that is returned by the mobile switching center according to the location update request message after the power-off is location update rejection information (that is, the registration with the PLMN_1 identifier is invalid), the user equipment fails to receive the location update rejection information because of being powered off, and then, upon next power-on, the user equipment still preferentially selects the PLMN_1 from the RPLMN information to send a location update request message, which prolongs a time for registering the user equipment with the mobile network. Therefore, by means of the determining in S204, the user equipment can prevent occurrence of the foregoing problem and ensures that a valid PLMN identifier is updated to the RPLMN information.

Optionally, the TMSI reallocation command sent by the mobile switching center carries an LAI (Location Area Identity). The LAI consists of an MCC, an MNC, and an LAC (Location Area Code), and it is also known that a PLMN consists of an MCC and an MNC. Therefore, it can be learned that the TMSI reallocation command carries a PLMN identifier, that is, carries the PLMN_1. Then, a specific implementation manner of updating, by the user equipment, the PLMN_1 to the RPLMN information may be: the user equipment acquires the PLMN_1 from the TMSI reallocation command and updates the PLMN_1 to the RPLMN information. This implementation manner enriches alternative manners of updating, by the user equipment, the RPLMN information.

S206. The user equipment skips updating the RPLMN information that is triggered by the TMSI reallocation command.

It can be learned from the 3GPP protocol described above that the TMSI reallocation command triggers the user equipment to update the RPLMN information.

Specifically, the user equipment does not perform the operation of updating the PLMN_1 to the RPLMN information. Therefore, the user equipment does not need to update a same PLMN_1 to the RPLMN information twice, which improves efficiency of registering the user equipment with the mobile network.

S207. The user equipment determines whether location update rejection information that is returned by the mobile switching center according to the location update request message is acquired.

Specifically, if the user equipment determines that the location update rejection information that is returned by the mobile switching center is acquired, the user equipment goes to step S208. If the user equipment determines that the location update rejection information that is returned by the mobile switching center is not acquired, the user equipment returns to step S204.

S208. The user equipment reselects another PLMN identifier from the available PLMN identifier set.

The receipt of the location update rejection information indicates that a PLMN identifier (such as the PLMN_1) currently used for registration is invalid and cannot enable the user equipment to access the mobile communications network. For example, network congestion occurs in a mobile switching center corresponding to the PLMN_1.

Specifically, after ruling out an invalid PLMN identifier (such as the PLMN_1) in the available PLMN identifier set, the user equipment reselects another PLMN identifier, and returns to step S202, so as to send, to a mobile switching center, a location update request message that carries the another PLMN identifier and perform registration again.

Optionally, the user equipment may select another PLMN identifier still according to the following priority order: "the RPLMN information→the HPLMN→information→the UPLMN information→the OPLMN information". For example, the PLMN_1 is a PLMN identifier selected from the RPLMN information, and it is assumed that it is determined, after the foregoing step is performed, that the PLMN_1 is invalid, the user equipment selects a PLMN identifier, such as PLMN_2, from the HPLMN information; if it is determined, after the foregoing step is performed, that the PLMN_2 is also invalid, the user equipment selects a PLMN identifier, such as PLMN_3, from the UPLMN information, and so on.

In this embodiment of the present invention, user equipment temporarily does not update RPLMN information when a TMSI reallocation command that is returned by a mobile switching center according to a location update request message is acquired, but updates the RPLMN information after it is determined that location update request acceptance information that is returned by the mobile switching center is received. This can improve efficiency of registering the user equipment with the mobile network and can also prevent the user equipment from updating an invalid PLMN identifier to the RPLMN information, thereby accelerating a speed of connecting the user equipment to the mobile network after the user equipment is powered on and improving user experience. In addition, this embodiment of the present invention further adds an operation to be performed after the user equipment receives location update rejection information, thereby improving an implementation process.

Figure 3:
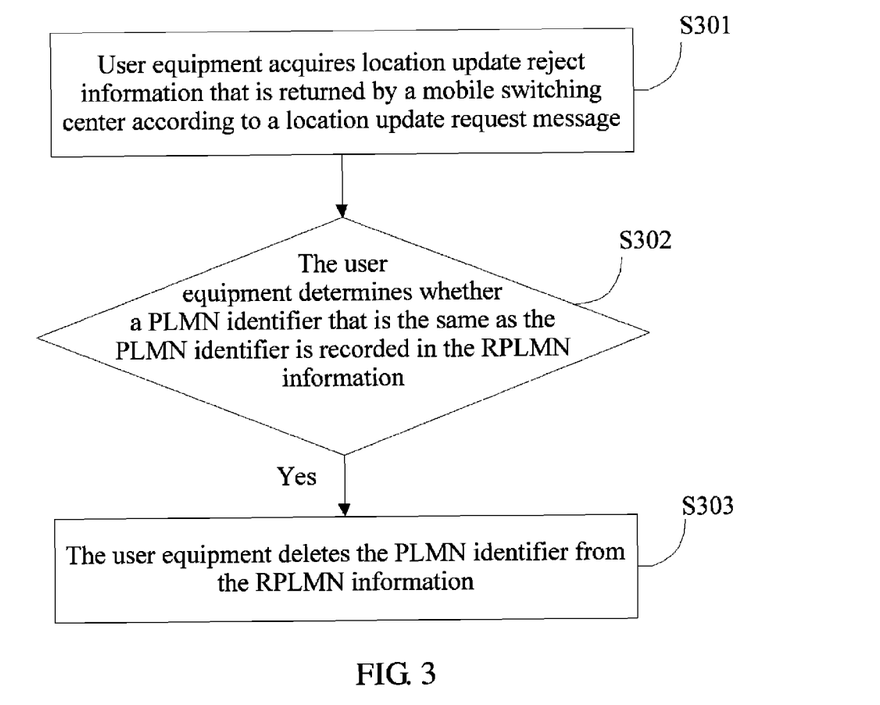
FIG. 3 is a schematic flowchart of a method for processing an invalid PLMN identifier according to an embodiment of the present invention.

FIG. 3 is a schematic flowchart of a method for processing an invalid PLMN identifier according to an embodiment of the present invention. The method for processing an invalid PLMN identifier is an addition to the embodiment provided for FIG. 2, that is, after sending location update rejection information to user equipment, a mobile switching center may further perform the following steps.

S301. The user equipment acquires the location update rejection information that is returned by the mobile switching center according to a location update request message.

The receipt of the location update rejection information indicates that a PLMN identifier currently used for registration is invalid and cannot enable the user equipment to access the mobile communications network. For example, network congestion occurs in the mobile switching center corresponding to the PLMN identifier (such as PLMN_1) currently used for registration.

S302. The user equipment determines whether a PLMN identifier that is the same as the PLMN identifier is recorded in the RPLMN information.

For example, if the PLMN identifier (that is, an invalid PLMN identifier) currently used for registration is the PLMN_1 and the PLMN identifier recorded in the RPLMN information is also PLMN_1, it is determined that the two PLMN identifiers are the same, and step S303 is performed.

S303. The user equipment deletes the PLMN identifier from the RPLMN information.

It can be concluded from the above: The PLMN identifier recorded in the current RPLMN information is an invalid PLMN identifier, and therefore, the user equipment deletes the PLMN identifier to prevent the user equipment from selecting the invalid PLMN identifier from the RPLMN information upon next power-on because the user equipment is powered off before a valid PLMN identifier is updated to the RPLMN information. This embodiment can further ensure validity of RPLMN information and accelerate a speed of connecting the user equipment to the mobile network after the user equipment is powered on.

Figure 4:
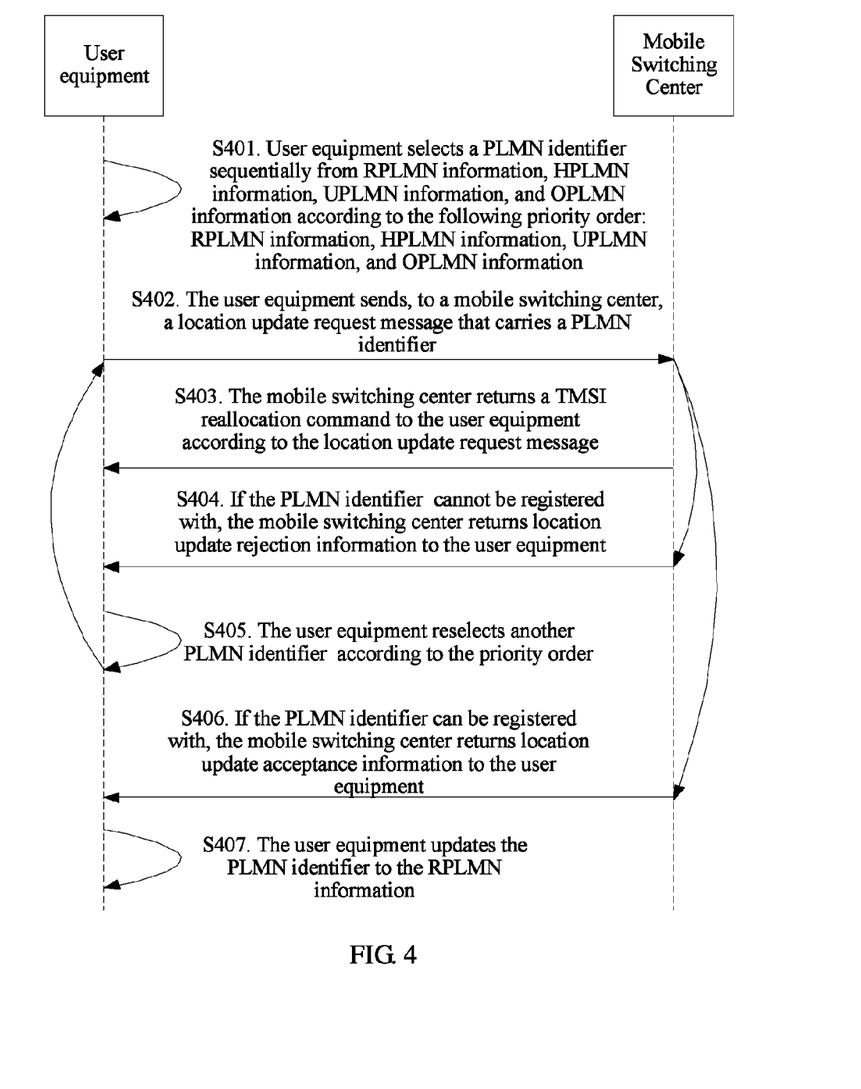
FIG. 4 is a schematic flowchart of still another method for updating RPLMN information according to an embodiment of the present invention.

FIG. 4 is a schematic flowchart of still another method for updating RPLMN information according to an embodiment of the present invention. In the embodiment of the present invention, both user equipment and a mobile switching center perform update of RPLMN information. Specific steps may include the following.

S401. A user equipment selects a PLMN identifier sequentially from RPLMN information, HPLMN information, UPLMN information, and OPLMN information according to the following priority order: RPLMN information, HPLMN information, UPLMN information, and OPLMN information.

The PLMN identifier is used to identify a PLMN. The PLMN is a network established and managed by a government or an operator to provide a land mobile communication service for the public. The PLMN is generally formed by multiple Cells, where the Cells are the smallest coverage units in a mobile communications network. The PLMN identifier is uniquely and jointly determined by an MCC and an MNC, where the MCC includes three digits and the MNC includes two digits.

The RPLMN information is stored in a card file EF_LOCI of a SIM card and records a PLMN identifier using which the user equipment initiates registration to the mobile switching center last time before last power-off. The SIM card may be disposed in the user equipment, so that the user equipment can read a card file of the SIM card. Specifically, the user equipment selects a PLMN identifier (PLMN_1 is used below to represent the selected PLMN identifier) sequentially from the RPLMN information, the HPLMN information, the UPLMN information, and the OPLMN information according to the following priority order: the RPLMN information, the HPLMN information, the UPLMN information, and the OPLMN information. It should be pointed out that, as the PLMN identifier using which the user equipment registers before last power-off, the PLMN identifier in the RPLMN information is of the highest priority because the PLMN identifier is optimal in terms of a registration success ratio and registration time.

S402. The user equipment sends, to a mobile switching center, a location update request message that carries a PLMN identifier.

Specifically, the user equipment sends, to the mobile switching center and based on the OTA, the location update request message that carries the PLMN_1. The location update request message, for example, the "Location_Update_Request" instruction in a 3GPP protocol, is used to initiate LU. A purpose of the LU is to register the user equipment with a PLMN identifier, so that the user equipment can access the mobile communications network.

S403. The mobile switching center returns a TMSI reallocation command to the user equipment according to the location update request message.

The TMSI is a temporary subscriber identity delivered, by using a VLR on a network side, to enhance confidentiality of a mobile communications system. To achieve the confidentiality, the VLR continuously updates the TMSI to the user equipment, where the updating the TMSI is initiated by an operation of sending, to the user equipment by the mobile switching center, a TMSI reallocation command, for example, the "TMSI_Reallocation_Command" instruction in a 3GPP protocol. When receiving the location update request message sent by the user equipment, the mobile switching center sends the TMSI reallocation command to the user equipment and based on the OTA. Therefore, after sending the location update request message to the mobile switching center, the user equipment acquires the TMSI reallocation command that is returned by the mobile switching center. It should be pointed out that an existing 3GPP protocol further stipulates that the TMSI reallocation command can trigger the user equipment to update the RPLMN information. For example, the user equipment updates the PLMN_1 to the RPLMN information.

S404. If the PLMN identifier cannot be registered with, the mobile switching center returns location update rejection information to the user equipment.

Specifically, the mobile switching center determines whether the PLMN_1 sent by the user equipment can be registered with. For a specific determining method, reference may be made to a 3GPP protocol, and details are not described herein. If the PLMN_1 cannot be registered with, the mobile switching center sends, to the user equipment and based on the OTA, the location update rejection information, for example, the "Location_Update_Reject" instruction in a 3GPP protocol.

S405. The user equipment reselects another PLMN identifier according to the priority order.

Specifically, after ruling out a PLMN identifier (such as the PLMN_1) that cannot be registered with and that is in the available PLMN identifier set, the user equipment reselects another PLMN identifier, and returns to step S402, so as to send, to a mobile switching center, a location update request message that carries the another PLMN identifier and perform registration again.

Optionally, the user equipment may select another PLMN identifier still according to the following priority order: "the RPLMN information→the HPLMN→information→the UPLMN information→the OPLMN information". For example, the PLMN_1 is a PLMN identifier selected from the RPLMN information, and it is assumed that it is determined, after the foregoing step is performed, that the PLMN_1 cannot be registered with, the user equipment selects a PLMN identifier, such as PLMN_2, from the HPLMN information; if it is determined, after the foregoing step is performed, that the PLMN_2 cannot be registered with, either, the user equipment selects a PLMN identifier, such as PLMN_3, from the UPLMN information, and so on.

It should be pointed out that the TMSI reallocation command mentioned above can trigger the user equipment to update the RPLMN information, that is, the user equipment updates the PLMN_1 to the RPLMN information. Herein, the user equipment ignores the update of the RPLMN information triggered by the TMSI reallocation command. According to a solution in the prior art, after acquiring the temporary identity TMSI reallocation command that is returned by the mobile switching center, the user equipment directly updates the PLMN_1 to the RPLMN information, resulting in the following problem: It is assumed that the user equipment is powered off after updating the PLMN_1 to the RPLMN information, and a message that is returned by the mobile switching center according to the location update request message after the power-off is location update rejection information (that is, the registration with the PLMN_1 identifier is invalid), the user equipment fails to receive the location update rejection information because of being powered off, and then, upon next power-on, the user equipment still preferentially selects the PLMN_1 from the RPLMN information to send a location update request message, which prolongs a time for registering the user equipment with the mobile network.

S406. If the PLMN identifier can be registered with, the mobile switching center returns location update acceptance information to the user equipment.

Specifically, if the PLMN_1 can be registered with, the user equipment sends, to the user equipment and based on the OTA, location update acceptance information, for example, the "Location_Update_Accept" instruction in a 3GPP protocol.

S407. The user equipment updates the PLMN identifier to the RPLMN information.

Specifically, the user equipment updates the PLMN_1 to the RPLMN information, that is, saves the PLMN_1 in the card file EF_LOCI of the SIM card.

Optionally, the TMSI reallocation command sent by the mobile switching center carries an LAI. The LAI consists of an MCC, an MNC, and an LAC, and it is also known that a PLMN consists of an MCC and an MNC. Therefore, it can be learned that the TMSI reallocation command carries a PLMN identifier, that is, carries the PLMN_1. Then, a specific implementation manner of updating, by the user equipment, the PLMN_1 to the RPLMN information may be: the user equipment acquires the PLMN_1 from the TMSI reallocation command and updates the PLMN_1 to the RPLMN information. This implementation manner enriches alternative manners of updating, by the user equipment, the RPLMN information.

In this embodiment of the present invention, user equipment does not update RPLMN information when a TMSI reallocation command that is returned by a mobile switching center according to a location update request message is acquired, but updates the RPLMN information when location update request acceptance information that is returned by the mobile switching center is received. This can improve efficiency of registering the user equipment with the mobile network and can also prevent the user equipment from updating an invalid PLMN identifier to the RPLMN information, thereby accelerating a speed of connecting the user equipment to the mobile network after the user equipment is powered on and improving user experience.

Figure 5:
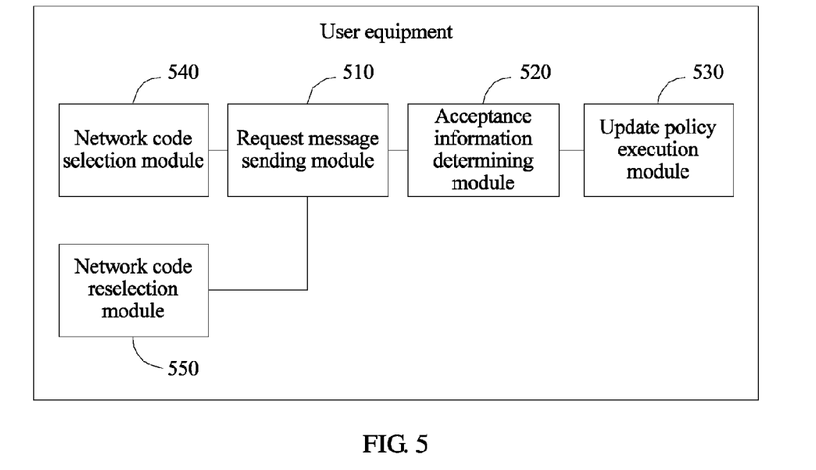
FIG. 5 is a schematic structural diagram of a type of user equipment according to an embodiment of the present invention.

FIG. 5 is a schematic structural diagram of a type of user equipment according to an embodiment of the present invention. As shown in FIG. 5, in this embodiment of the present invention, the user equipment may include at least a request message sending module 510, an acceptance information determining module 520, and an update policy execution module 530.

The request message sending module 510 is configured to send, to a mobile switching center, a location update request message that carries a PLMN identifier.

The PLMN identifier is used to identify a PLMN. The PLMN is a network established and managed by a government or an operator to provide a land mobile communication service for the public. The PLMN is generally formed by multiple Cells, where the Cells are the smallest coverage units in a mobile communications network. The PLMN identifier is uniquely and jointly determined by an MCC and an MNC, where the MCC includes three digits and the MNC includes two digits.

Specifically, after power-on, the request message sending module 510 sends, to the mobile switching center and based on the OTA, the location update request message that carries the PLMN identifier (PLMN_1 is used below to represent the PLMN identifier). The location update request message, for example, the "Location_Update_Request" instruction in a 3GPP protocol, is used to initiate LU. A purpose of the LU is to register the user equipment with a PLMN identifier, so that the user equipment can access the mobile communications network.

Further, the mobile switching center identified by the PLMN_1 receives the location update request message sent by the request message sending module 510. Then, the mobile switching center determines whether the PLMN_1 sent by the request message sending module 510 can be registered with. For a specific determining method, reference may be made to a 3GPP protocol, and details are not described herein. Generally, if the PLMN_1 can be registered with, the mobile switching center sends, to the user equipment and based on the OTA, location update acceptance information, for example, the "Location_Update_Accept" instruction in a 3GPP protocol; or if the PLMN_1 cannot be registered with, the mobile switching center sends, to the user equipment and based on the OTA, location update rejection information, for example, the "Location_Update_Reject" instruction in a 3GPP protocol.

The acceptance information determining module 520 is configured to: after a TMSI reallocation command that is returned by the mobile switching center according to the location update request message is acquired, determine whether location update acceptance information that is returned by the mobile switching center according to the location update request message is currently acquired.

The TMSI is a temporary subscriber identity delivered by using a VLR (Visitor Location Register, visitor location register) on a network side to enhance confidentiality of a mobile communications system. To achieve the confidentiality, the VLR continuously updates the TMSI to the user equipment, where the updating the TMSI is initiated by an operation of sending, to the user equipment by the mobile switching center, a TMSI reallocation command, for example, the "TMSI_Reallocation_Command" instruction in a 3GPP protocol. It should be pointed out that the TMSI reallocation command triggers the user equipment to update RPLMN information. For example, the user equipment updates the PLMN_1 to the RPLMN information. The RPLMN information is stored in a card file EF_LOCI of a SIM (subscriber identity module) card and records a PLMN identifier using which the user equipment initiates registration to the mobile switching center last time before last power-off. The SIM card may be disposed in the user equipment, so that the user equipment can read a card file of the SIM card.

Specifically, after acquiring the TMSI reallocation command that is returned by the mobile switching center according to the location update request message, the acceptance information determining module 520 first determines whether the location update acceptance information that is returned by the mobile switching center according to the location update request message is currently acquired.

The update policy execution module 530 is configured to: if the location update acceptance information is acquired, update the PLMN identifier to the RPLMN information; or if the location update acceptance information is not acquired, skip updating of the RPLMN information that is triggered by the TMSI reallocation command.

Specifically, if the location update acceptance information sent by the mobile switching center is acquired, the update policy execution module 530 updates the PLMN_1 to the RPLMN information, that is, saves the PLMN_1 in the card file EF_LOCI of the SIM card; or if the location update acceptance information sent by the mobile switching center is not acquired, the user equipment does not update the PLMN_1 to the RPLMN information. Therefore, the user equipment does not need to update the PLMN_1 to the RPLMN information twice, which improves efficiency of registering the user equipment with the mobile network.

Optionally, the TMSI reallocation command sent by the mobile switching center carries an LAI (Location Area Identity, location identity). The LAI consists of an MCC, an MNC, and an LAC (Location Area Code, location code), and it is also known that a PLMN consists of an MCC and an MNC. Therefore, it can be learned that the TMSI reallocation command carries a PLMN identifier, that is, carries the PLMN_1. Then, a specific implementation manner of updating, by the update policy execution module 530, the PLMN_1 to the RPLMN information may be: the update policy execution module 530 acquires the PLMN_1 from the TMSI reallocation command and updates the PLMN_1 to the RPLMN information. This implementation manner enriches alternative manners of updating, by the user equipment, the RPLMN information.

Optionally, referring to FIG. 5, as shown in FIG. 5, the user equipment in this embodiment of the present invention may further include a network code selection module 540, configured to select the PLMN identifier from an available PLMN identifier set, where the available PLMN identifier set includes PLMN identifiers from RPLMN information, HPLMN information, UPLMN information, and OPLMN information.

The network code selection module 540 selects the PLMN identifier from all of the foregoing types of information according to the following priority order: the RPLMN information→the HPLMN→information→the UPLMN information→the OPLMN information. It should be pointed out that, as the PLMN identifier with which the user equipment is registered before last power-off, the PLMN identifier in the RPLMN information is of the highest priority because of the most ideal registration success ratio and registration time.

Specifically, after power-on, the network code selection module 540 selects a PLMN identifier according to the foregoing priority order, and then the request message sending module 510 sends, to the mobile switching center, a location update request message that carries the PLMN_1.

In addition, optionally, referring to FIG. 5, as shown in FIG. 5, the user equipment in this embodiment of the present invention may further include a network code reselection module 550, configured to reselect another PLMN identifier from the available PLMN identifier set if location update rejection information that is returned by the mobile switching center according to the location update request message is acquired, where the request message sending module 510 is further configured to implement sending, to the mobile switching center, of a location update request message that carries the reselected PLMN identifier.

The receipt of the location update rejection information indicates that a PLMN identifier (such as the PLMN_1) currently used for registration is invalid and cannot enable the user equipment to access the mobile communications network. For example, network congestion occurs in a mobile switching center corresponding to the PLMN_1.

Specifically, after an invalid PLMN identifier (such as the PLMN_1) is ruled out, the network code reselection module 550 reselects another PLMN identifier from the available PLMN identifier set and triggers the request message sending module 510 to send, to a mobile switching center, a location update request message that carries the another PLMN identifier and perform registration again.

Optionally, the network code reselection module 550 may select another PLMN identifier still according to the following priority order: "the RPLMN information→the HPLMN-→information→the UPLMN information→the OPLMN information". For example, the PLMN_1 is a PLMN identifier selected from the RPLMN information, and it is assumed that it is determined, after the foregoing step is performed, that the PLMN_1 is invalid, the user equipment selects a PLMN identifier, such as PLMN_2, from the HPLMN information; if it is determined, after the foregoing step is performed, that the PLMN_2 is also invalid, the user equipment selects a PLMN identifier, such as PLMN_3, from the UPLMN information, and so on.

Figure 6:
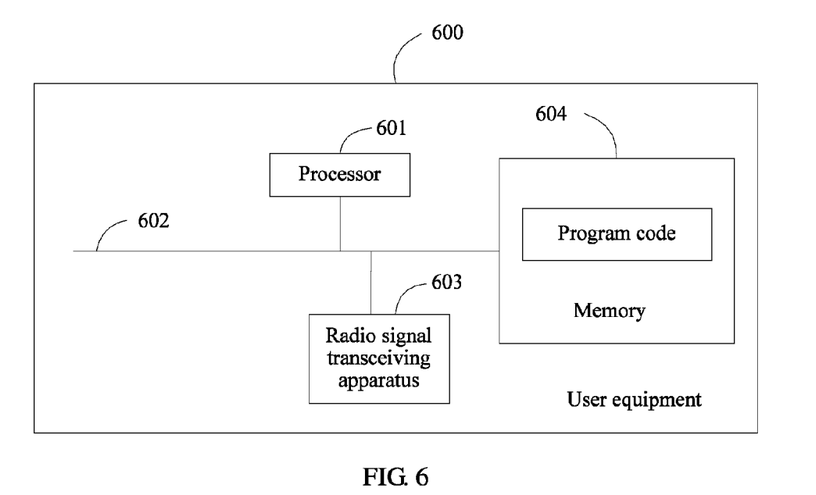
FIG. 6 is a schematic structural diagram of another type of user equipment according to an embodiment of the present invention.

FIG. 6 is a schematic structural diagram of another type of user equipment according to an embodiment of the present invention. As shown in FIG. 6, the user equipment may include: at least one processor 601, such as a CPU; at least one radio signal transceiving apparatus 603; a memory 604; and at least one communications bus 602. The communications bus 602 is configured to implement connection communication between the components. In this embodiment of the present invention, the radio signal transceiving apparatus 603 of the user equipment may include an antenna apparatus, configured to perform signaling or data communication with another node device. The memory 604 may be a high-speed RAM memory, or may be a non-volatile memory (non-volatile memory), such as at least one magnetic disk memory. Optionally, the memory 604 may further be at least one storage apparatus located far away from the foregoing processor 601.

A set of program code is stored in the memory 604, and the processor 601 is configured to invoke a program code stored in the memory to perform the following operations: sending, to a mobile switching center, a location update request message that carries a PLMN identifier; after a TMSI reallocation command that is returned by the mobile switching center according to the location update request message is acquired, determining whether location update acceptance information that is returned by the mobile switching center according to the location update request message is currently acquired; and if the location update acceptance information is acquired, updating the PLMN identifier to RPLMN information; or if the location update acceptance information is not acquired, skipping an operation of updating the PLMN identifier to RPLMN information, where the operation is triggered by the TMSI reallocation command.

Optionally, before the processor 601 sends, to the mobile switching center, the location update request message that carries a PLMN identifier, the operations further include selecting the PLMN identifier from an available PLMN identifier set, where the available PLMN identifier set includes PLMN identifiers that are included in the RPLMN information, home public land mobile network HPLMN information, user selected public land mobile network UPLMN information, and operator provided public land mobile network OPLMN information separately.

Further, the processor 601 selects the PLMN identifier from an available PLMN identifier set sequentially according to the following priority order: the PLMN identifier in the RPLMN information, the PLMN identifier in the HPLMN information, the PLMN identifier in the UPLMN information, and the PLMN identifier in the OPLMN information.

In addition, optionally, after the processor 601 sends, to the mobile switching center, the location update request message that carries a PLMN identifier, the operations further include, if location update rejection information that is returned by the mobile switching center according to the location update request message is acquired, reselecting another PLMN identifier from the available PLMN identifier set and implementing sending, to the mobile switching center, of a location update request message that carries the reselected PLMN identifier.

In addition, optionally, after the processor 601 acquires the location update rejection information that is returned by the mobile switching center according to the location update request message, the operations further include determining whether a PLMN identifier that is the same as the PLMN identifier is recorded in the RPLMN information; and, if a PLMN identifier that is the same as the PLMN identifier is recorded in the RPLMN information, deleting the PLMN identifier from the RPLMN information.

In addition, optionally, because a TMSI reallocation command may carry the PLMN identifier, that the processor 601 updates the PLMN identifier to the RPLMN information is specifically updating, to the RPLMN information, the PLMN identifier carried in the TMSI reallocation command.

An embodiment of the present invention further proposes a computer storage medium, where a program is stored in the computer storage medium, and when being executed, the program implements a part or all of steps of the method for updating RPLMN information described in this embodiment of the present invention with reference to FIG. 1, FIG. 2, and FIG. 4.

An embodiment of the present invention further proposes another computer storage medium, where a program is stored in the computer storage medium, and when being executed, the program implements a part or all of steps of the method for processing an invalid PLMN identifier described in this embodiment of the present invention with reference to FIG. 3.

In this embodiment of the present invention, user equipment temporarily does not update RPLMN information when a TMSI reallocation command that is returned by a mobile switching center according to a location update request message is acquired, but updates the RPLMN information after it is determined that location update request acceptance information that is returned by the mobile switching center is received. This can improve efficiency of registering the user equipment with the mobile network and can also prevent the user equipment from updating an invalid PLMN identifier to the RPLMN information, thereby accelerating a speed of connecting the user equipment to the mobile network after the user equipment is powered on and improving user experience.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (ROM), or a random access memory (RAM).

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A method implemented by an user equipment (UE), the method comprising: selecting a public land mobile network (PLMN) identifier from an available PLMN identifier set, wherein the available PLMN identifier set comprises PLMN identifiers that are comprised in RPLMN (registered PLMN) information, HPLMN (home PLMN) information, UPLMN (user selected PLMN) information, and OPLMN (operated provided PLMN) information separately; sending, to a mobile switching center (MSC), a location update request message that carries the PLMN identifier; acquiring a temporary mobile subscriber identity (TMSI) reallocation command from the MSC according to the location update request message; performing an operation of updating the PLMN identifier to the RPLMN information when the location update acceptance information is received via the TMSI reallocation command; skipping the operation of updating the PLMN identifier to the RPLMN information when the location update acceptance information is not received via the TMSI reallocation command; and deleting the PLMN identifier from the RPLMN information when a PLMN identifier is the same as the PLMN identifier recorded in the RPLMN information, wherein the operation is triggered by the TMSI reallocation command, and wherein the method successfully registers the UE with the MSC.

2. The method according to claim 1, wherein a priority order for the selecting the PLMN identifier from the available PLMN identifier set is: the PLMN identifier in the RPLMN information, the PLMN identifier in the HPLMN information, the PLMN identifier in the UPLMN information, and the PLMN identifier in the OPLMN information.

3. The method according to claim 1, further comprising:
   acquiring a location update rejection information that is returned by the MSC according to the location update request message; after sending the location update request message that carries the PLMN identifier, reselecting another PLMN identifier from the available PLMN identifier set; and
   sending, to the MSC, a location update request message that carries the reselected PLMN identifier.

4. The method according to claim 1, wherein the TMSI reallocation command carries the PLMN identifier, and wherein updating the PLMN identifier to RPLMN information comprises updating, to the RPLMN information, the PLMN identifier carried in the TMSI reallocation command.

5. The method according to claim 4, wherein the RPLMN information is stored in a card file EF_LOCI of a subscriber identity module (SIM) card.

6. A user equipment (UE) comprising: a non-transitory memory storing instructions; and a processor coupled to the memory and configured to execute the instructions to: select a public land mobile network (PLMN) identifier from the RPLMN (registered PLMN) information, HPLMN (home PLMN) information, (user selected PLMN) information, and OPLMN (operated provided PLMN) information sequentially according to the following priority order: the RPLMN information, the HPLMN information, the UPLMN information, and the OPLMN information; send, to a mobile switching center (MSC), a location update request message that carries the PLMN identifier; after a temporary mobile subscriber identity (TMSI) reallocation command that is returned by the MSC according to the location update request message, perform an operation of updating the PLMN identifier to the RPLMN information when the location update acceptance information is received via the TMSI reallocation command; skip the operation of updating the PLMN identifier to the RPLMN information when the location update acceptance information is not received via the TMSI reallocation command; and delete the PLMN identifier from the RPLMN information when a PLMN identifier is the same as the PLMN identifier recorded in the RPLMN information, wherein the operation of updating is triggered by the TMSI reallocation command, and wherein the UE is successfully registered with the MSC.

7. The UE according to claim 6, wherein the processor is configured to execute the instructions to reselect another PLMN identifier when a location update rejection information that is returned by the MSC according to the location update request message is acquired, and to implement sending, to the MSC, of a location update request message that carries the reselected PLMN identifier.

8. The UE according to claim 7, wherein the TMSI reallocation command carries the PLMN identifier, and wherein the processor is configured to execute the instructions to update, to the RPLMN information, the PLMN identifier carried in the TMSI reallocation command.

9. The UE according to claim 8, wherein the RPLMN information is stored in a card file EF_LOCI of a subscriber identity module card.

10. A user equipment (UE) comprising: a radio signal transceiver; a memory storing a set of programs; and a processor configured to invoke a program stored in the memory to perform the following operations: sending, to a mobile switching center (MSC), a location update request message that carries a PLMN identifier; acquiring a TMSI reallocation command from the MSC according to the location update request message; performing an operation of updating the PLMN identifier to a RPLMN information when the location update acceptance information is received via the TMSI reallocation command; skipping the operation of updating the PLMN identifier to RPLMN information when the location update acceptance information is not received via the TMSI reallocation command; and deleting the PLMN identifier from the RPLMN information when a PLMN identifier is the same as the PLMN identifier recorded in the RPLMN information, wherein the operation is triggered by the TMSI reallocation command, and wherein the UE successfully registers with the MSC.

\* \* \* \* \*